April 21, 1970  W. M. MERCER  3,507,585
ROTARY DIAPHRAGM PUMP
Filed April 24, 1968
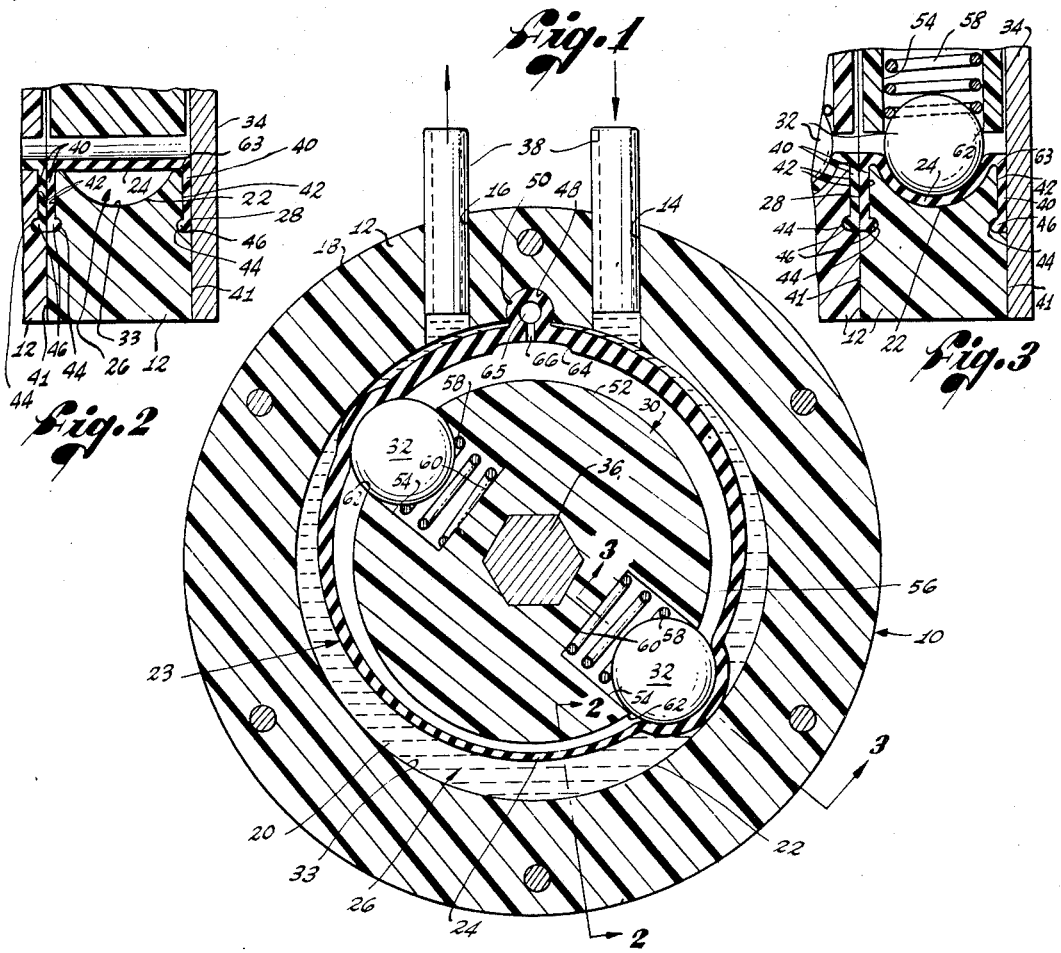
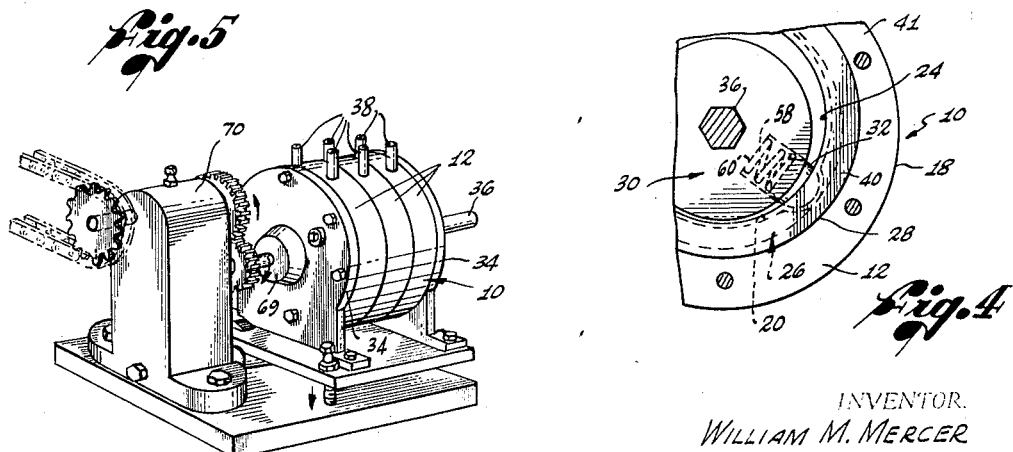
INVENTOR.
WILLIAM M. MERCER
BY Fulwider, Patton, Rieber
Lee and Utecht
ATTORNEYS United States Patent Office
3,507,585
Patented Apr. 21, 1970

3,507,575
ROTARY DIAPHRAGM PUMP
William M. Mercer, 2014 W. Florence Ave.,
Los Angeles, Calif. 90047
Filed Apr. 24, 1968, Ser. No. 723,663
Int. Cl. F04b 43/08, 25/04
U.S. Cl. 417—475                          14 Claims

ABSTRACT OF THE DISCLOSURE

A rotary pump having a cylindrical housing with a centrally located bore. A recess of circular cross section is cut into the periphery of the bore and the recess varies in depth around the periphery of the bore. A flexible diaphragm extends across the periphery of the bore which cooperates with the recess to form a pump chamber. A rotating actuator has diametrically opposed, radially outwardly biased, spherical rollers which urge the diaphragm into sealing engagement with the wall of the recess to achieve pumping action. The diaphragm is of varying thickness around the recess and cooperates with the recess to provide a path of travel for the spherical rollers which is substantially circular with an axis substantially coincident with the axis of the actuator to reduce radial movement of the rollers to a minimum. A plurality of modular pump assemblies may be stacked and driven with a common shaft.

Background of the invention

The present invention relates generally to rotary pumps and more particularly to a rotary pump of the diaphragm type in which a moving sealing engagement between a flexible diaphragm and a rigid housing generates suction and pumping at respective inlet and outlet passages.

Rotary pumps of the diaphragm, or the flexible tube type, are extensively used where it is desired to isolate the pumped fluid from the internal elements of the pump itself. As an example, the pump chamber of a rotary pump may be constructed of corrosion resistant materials which may be too expensive or unsuitable for the remainder of the pump. Another example is when it is desired to pump relatively sterile fluids like blood and it would be practically impossible to completely sterilize the entire pump. In such cases, only the part of the pump which contacts the sterile fluids need be sterilized.

The rotary pump is also useful as a flow meter as the volume of fluid pumped over a period of time is practically linearly related to the speed of rotation of the pump over a fairly large range of pumping speeds.

Both of the above capabilities of rotary pumps are used to advantage in certain applications, such as irrigation, in which fertilizing chemicals are added to the pumped irrigation water. In these applications, the corrosive chemical solution can be passed through the pump without contacting the pump elements and the volume of fluid passing through the pump can be determined by relating the speed at which the pump is run for a particular time to the relatively linear speed versus volume characteristic of the pump.

In the past, certain problems and disadvantages have been encountered in the use of rotary diaphragm pumps. For example, the diaphragms in such pumps are subjected to constant flexing and the useful lifetime of the diaphragm is often quite low. This is especially true when the shape of the rolling member causes an uneven tension in different areas of the flexed diaphragm. Also, because a good seal between a diaphragm and the housing is required, many cumbersome clamping arrangements for the diaphragm were employed, making replacement and servicing of the diaphragm difficult.

The effective operation of a rotary diaphragm pump is dependent upon a good sealing engagement of the diaphragm with the pump chamber and the moving seal ordinarily deteriorates with an increasing speed of rotation of the actuator carrying the rolling members. Also, the construction of ordinary rotary pumps is such that there is substantial radial movement of the roller members with respect to the axis of the rotating actuator. At relatively high rates of revolution, such radial movements of the roller members causes uneven pulsations and a fluttering of the output of the pump.

When eccentric rotors are employed, high speeds of rotation are practically impossible because of the resultant vibration and imbalance of the entire pump.

In certain rotary pump applications, such as irrigation, it is often desired to operate a number of pumps at one time in order to evenly irrigate areas of differing height above the pumping station. The physical construction of conventional pumps, including the cumbersome clamping arrangements for the diaphragms, is not easily adaptable to the tandem operation of a number of pumps. Also, in such applications as irrigation, rotary pumps must be continuously run for extensive periods of time and the relatively low lifetime of the diaphragms in ordinary pumps is a distinct diasadvantage.

Thus, there has been a long existing need for rotary diaphragm pumps, for certain applications such as irrigation, which could be operated for long periods of time without diaphragm fatigue and which could be operated efficiently at higher speeds of rotation than possible with formerly available rotary pumps.

Summary of the invention

To solve the above problems encountered with rotary diaphragm pumps, the present invention provides such a pump with a rolling member of arcuate cross section and a correspondingly shaped recess in the pump housing which results in the diaphragm being subjected to substantially uniform tension as it is urged into the recess by the rolling member. The lifetime of a diaphragm is materially lengthened because of the substantially uniform tension to which it is subjected.

In the preferred embodiment of the present invention, the depth of the recess in the pump housing varies around its circumference and the thickness of the diaphragm across the recess varies correspondingly. The depth of the recess and the varying thickness of the diaphragm are such that the path of travel of the rolling member is substantially circular with the axis of the path substantially coincident with the rotor carrying the rolling member. By virtue of this arrangement, radical movement of the rolling member with respect to the rotor in the pump housing is minimized. The substantially reduced radial movement of the rolling member as compared to pumps of the prior art allows the speed of rotation of the rotor carrying the rolling member to be increased considerably without appreciable impairment of the pumping efficiency.

In addition, the preferred embodiment of the present invention is of simplified physical construction utilizing a U-shaped liner with the center section forming the liner and the parallel sides forming flanges which are set flush with the sides of the housing. The liners may then be secured in place by a simple end plate on the side of the housing or a number of pump assemblies may be stacked side by side in modular fashion with adjacent flanges being cooperatively held in place by the respective abutting sides of the pump housings. When the modular arrangement is used, only a single pair of end plates are needed to secure a number of pump assemblies in place.

Thus, the rotary diaphragm pump of the present invention provides a pump with increased diaphragm life, a diaphragm-pump chamber construction which substantially minimizes radial movement of the rolling member of the rotor increasing the rotational speeds at which the rotor can be efficiently operated. The present rotary diaphragm pump is also of simplified physical construction and is particularly adaptable to a modular arrangement of a number of pump assemblies into one unit to be driven from a common source.

Brief description of the drawings

FIGURE 1 is a sectional view of a rotary pump embodying the present invention;

FIGURE 2 is a fragmentary sectional view taken along the line 2—2 of FIGURE 1;

FIGURE 3 is also a fragmentary sectional view taken along the line 3—3 of FIGURE 1;

FIGURE 4 is a fragmentary elevational view of the rotary pump on a diminished scale; and FIGURE 5 is a perspective view on a diminished scale of a plurality of stacked pump assemblies embodying the present invention, shown with an associated gearbox through which the pump assemblies are driven.

Description of the preferred embodiment

Referring now to the drawing, the rotary diaphragm pump 10 of the present invention has an annular housing 12 with inlet and outlet passages 14 and 16, respectively, to the external circumference 18 of the housing. A central bore 20 in the housing 12 has a variable depth recess 22 of arcuate cross section cut into its periphery. As may be seen in FIGURES 1 and 4, the axis of the recess 22 is slightly offset from the axis of the bore 20 resulting in the recess being of varying depth around the periphery of the bore 20. A liner 23 fits around the bore 20 and has a diaphragm 24 extending across the recess and cooperating therewith to form a pump chamber 26.

An actuator 30 is rotationally mounted within the bore 20 and has a pair of radially outwardly urged rollers 32 at diametrically opposite positions which depress the diaphragm 24 into sealing engagement with the wall 33 of the recess 22. One or more pump assemblies or modules may be mounted between a pair of end plates 34 (FIGURE 5) with the actuators 30 of the pump assemblies mounted on a common drive shaft 36.

As the actuator 30 rotates, the moving sealing engagement of the diaphragm 24 against the wall 33 of the recess 22 draws fluid into the inlet passage 14 by progressively increasing the intake portion of the pump chamber 26, that is, the portion of the chamber between the region of sealing engagement and the inlet passage. Conversely, the output portion of the pump chamber 26 between the sealing engagement and the outlet passage 16 decreases, causing an outflow of fluid. The shape of the chamber defined by the recess 22 and diaphragm 24 is such that the volume of the chamber portion which is sealed off from the inlet and outlet passages 14, 16 remains substantially constant, as is desirable, during rotation of the actuator 30.

The housing is preferably of unitary construction and made of a material suitable for use with the fluid to be pumped, but which can be conveniently mass produced. In the preferred embodiment illustrated, the housing 12 is made of a corrosion resistant high density polyethylene plastic. It should be appreciated, however, that the material chosen for the housing 12 is primarily dependent upon the type of fluid to be pumped as there is a direct contact of the pumped fluid with the recess 22 in the housing.

The inlet and outlet passages 14, 16 comunicate between the recess 22 and the external circumference 18 of the housing 12. The passages 14, 16 extend parallel to and are spaced a short distance from one another in the region of minimum depth of the recess 22. These passages 14, 16 are preferably fitted with a pair of stainless steel tubes 38 to which hoses (not shown) may be clamped.

The diaphragm 24 varies in thickness around its circumference with the thickest area being in the transition region between the inlet and outlet passages 14, 16, and the thinnest area being diametrically opposite the transition region. The variation in thickness of the diaphragm 24 has important functions in the illustrated embodiment of the pump 10.

The increased thickness of the diaphragm 24 in the transition region prevents the flexible material of the diaphragm from being pushed into the passages 14, 16 by the rollers 32, thereby preventing punching or cutting of the diaphragm at those locations. Referring to FIGURE 1, it may be seen that the diaphragm 24 is in fixed engagement with the wall 33 of the recess 22 in the transition region and there is little depression of the diaphragm in that region as the rollers pass over it. The gradual thickening of the diaphragm 24 as it approaches the transition region ensures that there is no abrupt change in the resistance offered by the diaphragm to the rollers 32 as they pass over the region.

It will be appreciated that the resistance to deformation offered by the diaphragm 24 decreases as the thickness of the diaphragm decreases. As may be seen in FIGURE 1, the diaphragm 24 becomes thinner as the depth of the recess 22 increases. Thus, in this instance, the resistance to deformation of the diaphragm 24 decreases as the depth of the recess 22 increases. As a result, a substantially constant force exerted by the rollers 32 depresses the diaphragm 24 into sealing engagement with the wall 33 of the recess 22 around the entire circumference of the recess and the force of engagement remains substantially constant.

Referring again to FIGURE 1, it may be seen that the cross-sectional area of the pump chamber 26 defined by the recess 22 and the diaphragm 24 varies from a minimum in the region of the inlet and outlet passages 14, 16 to a maximum in the region diametrically opposite the passages. Notwithstanding this variation in area of the pump chamber 26, the combination of the varying thickness of the diaphragm 24 and the varying depth of the recess 22 is such that the path travelled by the rollers 32 is substantially circular with an axis substantially coincident with that of the actuator 30. This, in turn, results in minimal radial movement of the rollers 32 with respect to the actuator 30 as the actuator is rotated. Consequently, the urging force exerted by the rollers 32 against the diaphragm 24 is substantially constant around the periphery of the diaphragm 24. The substantially constant force can be easily adjusted to ensure an effective sealing engagement between the diaphragm 24 and the recess 22 at all times. It should be noted that, as the depth of the recess 22 increases, the amount of fluid which is drawn into the pump chamber 26 also increases. There is, however, no substantial change in the force exerted by the rollers 32 as discussed above.

It will be appreciated that the relative positions of the axes of the bore 20, the recess 22 and the actuator 30 are all interdependent and related to the thickness of the diaphragm 24. In practice, the relative positions of the axes are adjusted to minimize radial movement of the rollers 32.

The liner 23 is a generally circular ring of resilient, flexible material. The ring has a generally U-shaped cross section with the previously described diaphragm 24 and parallel side flanges 40 integral with the diaphragm. The liner 23 is adapted to be mounted around the bore 20 with the diaphragm 24 abutting the periphery of the bore and the side flanges 40 extending radially outward over the sides 41 of the housing 12. In order to prevent excessive compression of the side flanges 40 of the liner 23 when the end plates 34 are secured in place, the area of the sides 41 of the housing 12 adjacent the bore is slightly cut away to form insets 42 on either side of the housing which receive the flanges (best seen in FIGURES 2 and 3). The depth of the insets 42 is slightly less than the thickness of the side flanges 40.

To enhance the seal between the side flanges 40 and the insets 42, grooves 44 are cut into the outer periphery of the insets 42 and cooperating projecting lips 46 are provided on the outer peripheries of the side flanges 40.

Thus, when the end plates 44 are secured on either side 41 of the housing 12, the diaphragm 24 is secured in place across the recess 22 by the integral side flanges 40 which are, in turn, securely clamped between the end plates and the insets 42 in the sides 41 of the housing. When a modular pump arrangement is used, as is best seen in FIGURES 2 and 3, the side flanges 40 of adjacent pump modules are in abutment and are securely held in place by the respective sides 41 of the housing 12 without the necessity for an intermediate end plate.

It should be appreciated that the diaphragm 24 of the liner 23, and possibly portions of the inside areas of the side flanges 40, will be in contact with the fluid to be pumped and that the material for the liner should be chosen accordingly. The other requirements of the material for the liner 28 are that it be flexible enough so that an adequate sealing engagement between the diaphragm 24 and the wall 33 of the recess 22 without the application of an excessive force on the diaphragm through the rollers 32. An example of a flexible material which has been found to be adequate for pumping somewhat corrosive fluids is a rubber of the neoprene type.

In order to block the pump chamber 26 between the relatively closely spaced inlet and outlet passages 14, 16, a substantially cylindrically shaped notch 48 is provided across the periphery of the bore 20 into which fits a correspondingly shaped ridge 50 on the outer periphery of the diaphragm 24.

As mentioned above, the engagement of the diaphragm 24 with the recess 22 in the transition region is fixed and there would ordinarily be little depression of the diaphragm in that region. Therefore, to practically eliminate radial movement of the rollers 32 as they cross the transition region, it is desirable to substantially equalize the depression of the diaphragm 24 in the transition region with the depression of the diaphragm on either side of the region. For this purpose, the thickness of the diapragm 24 is reduced in the transition region by a depression 64 and the ridge 50 is provided with a cushioning chamber 65 and a pair of bleed passages 66 communicating with the inside of the bore 20.

The actuator 30 carrying the rollers 32 is rotationally mounted on a drive shaft 36 through the bore 20 of the housing 12. The actuator 30 has a generally cylindrically shaped rotor 52 here constructed of a material similar to that of the housing 12. The rotor 52 is keyed onto the hexagonal drive shaft 36 for rotation about its axis but the rotor is free to slide axially along the drive shaft. The drive shaft 36 is supported in bearings 69 in the end plates 34 of the pump 10.

In the preferred embodiment of the pump 10 shown, the rollers 32 are spherical in shape and are set in diametrically opposite, radially extending channels 54 in the periphery 56 of the rotor 52. The spherical rollers 32 are resiliently urged into contact with diaphragm 24 by means of springs 58 compressed between the rollers 32 and the bottoms 60 of the channels 54. This force exerted by the springs 58 is sufficient to depress the diaphragm 24 into sealing engagement with the wall 33 of the recess 22 around the entire periphery of the recess. In the embodiment illustrated, the diameter of the rotor 52 is such that the centers of the spherical rollers 32 are maintained radially inwardly of the periphery 56 of the rotor. This prevents wedging of the rollers between the diaphragm 24 and the periphery of the rotor.

The use of spherical rollers 32 results in a substantially uniform tension being applied across the diaphragm 24 as the rollers 32 pass over it. In particular, as the spherical rollers 32 pass over the diaphragm 24, the center portion of the diaphragm is contacted and depressed first which tends to apply uniform tension across the entire diaphragm. The uniform tension is gradually increased as the moving spherical rollers 32 depress the diaphragm 24 into complete sealing engagement with the wall 33 of the recess 22, as shown in FIGURE 3. It should also be noted that the edges 63 of the bore 20 are rounded where they meet the recess 22 so that there are no sharp bends in the diaphragm at any point along the sealed engagement with the wall 33 of the recess 22. The combined factors of the uniformly applied tension and the smooth bends in the diaphragm 24 at the region of sealing engagement results in a greatly increased life of each diaphragm employed in the rotary diaphragm pump 10 of the present invention. In the operation of the pump 10, the space between the actuator 30 and diaphragm 24 may be oil-filled to further reduce diaphragm wear.

It will be appreciated that the diameter of the spherical rollers 32 for optimum sealing engagement with the wall 33 the recess 22 is determined by the radius of curvature of the recess and the thickness of the diaphragm 24. As the radius of curvature of the recess 22 and the diameter of the spherical rollers 32 remain constant, the variation of the thickness of the diaphragm 24 around the circumference of the recess 22 is compensated for by the resiliency of the diaphragm material.

As mentioned above, the configuration of the pump housing 12 and liner 28 is such that a number of pump assemblies or modules can be assembled into a modular pump by stacking the modules between the end plates 34 with all of the actuators 30 keyed to a common drive shaft 36 set in bearings 69 in the end plates (as shown in FIGURE 5). In this respect, it should be noted that the spherical rollers 32 provide an essentially automatic lateral alignment of the actuators 30 with respect to the diaphragm 24 and recess 22. The actuators 30 are free to axially slide along the hexagonal drive shaft 36 into substantially perfect alignment with its respective recess 22.

In certain applications of the rotary diaphragm pump 10 of the present invention, such as for irrigation purposes, the improved characteristics of the pump can be used to great advantage. For example, when it is desired to irrigate a hilly area, using only one pump results in a difference in the amount of irrigating fluid applied to areas of differing height above the pumping station. Utilizing a modular pump employing a number of pump modules embodying the present invention, all driven from a common shaft, it can be seen that a separate pump module can be used for each of the areas of differing height thereby ensuring that each area receives approximately the same amount of irrigating fluid. It can be seen that the need for complicated arrangements for connecting a number of single pump units is thereby avoided. It can also be seen that the number of pump modules in a single unit can be easily increased or decreased.

The greater range of operating speeds available with a rotary diaphragm pump 10 constructed according to the present invention can also be used to advantage by driving the pump with a gear box 70 with a number of interchangeable gears to provide a wide variety of driving speeds for the pump. The volume of irrigating fluid supplied by the pump 10 in a given time can then be easily adjusted by modifying the speed of the pump.

Thus, it can be seen that a rotary pump constructed according to the present invention can be operated efficiently at greater speeds than were attainable before and with an increased diaphragm lifetime which was previously impossible. The physical construction of the pump is such that a number of pump modules can be combined and driven from a common source.

It will be understood that while a particular preferred embodiment of the invention has been described and illustrated, modification of the design and construction can be made without departing from the spirit and scope of the invention. Hence the invention is not to be limited except as defined in the appended claims.

I claim:

1. A rotary pump, comprising:
   a housing with a bore therethrough, said housing having a recess around the periphery of said bore;
   diaphragm means mounted on said housing and cooperating with said recess to define a pump chamber of varying cross-sectional area around said recess, the cross-sectional area of said pump chamber varying from a minimum at a first location to a maximum at a second location which is approximately diametrically opposite said first location said diaphragm means being of varying thickness around said recess with the maximum thickness of said diaphragm means being located adjacent said first location and the minimum thickness of said diaphragm means being in the region of said second location;
   means on said housing forming inlet and outlet passages to said chamber, said passages being in communication with one another through said chamber; and
   a rotary actuator mounted within said bore, said rotary actuator including means carried thereby for urging said diaphragm into sealing engagement with the wall of said recess over a limited region thereof.

2. A rotary pump as in claim 1, wherein said recess has, in cross-section, a substantially uniform radius of curvature.

3. A rotary pump, comprising:
   a housing with a bore therethrough having a central axis, said housing having a continuous recess of arcuate cross section around the periphery of said bore;
   diaphragm means formed of a resilient, flexible material mounted on said housing and cooperating with said recess to define a pump chamber of varying cross-sectional area around said recess, said cross-sectional area being minimum at a first location on said housing and maximum at a second location on said housing;
   means on said housing, adjacent one another, forming inlet and outlet passages to said chamber adjacent said first location;
   means on said housing and on said diaphragm blocking direct communication from said inlet passage to said outlet passage through said chamber in the region of said first location;
   a rotary actuator rotatable about an axis parallel to said central axis and displaced therefrom toward said second location; and
   diaphragm-engaging means on said actuator for urging said diaphragm into uniform sealing engagement with the walls of said recess over a limited region thereof, whereby rotation of said actuator about its axis produces a generally uniform strain on the material of said diaphragm in the region of said engagement.

4. A rotary pump as in claim 3, wherein said blocking means includes means forming a generally longitudinally extending notch on said housing on the wall of said bore and a correspondingly shaped ridge formed integral with said diaphragm means engageable with said notch.

5. A rotary pump as in claim 3, wherein:
   said recess is formed about a second axis parallel to said central axis; and
   said diaphragm means is of varying thickness around the said recess with the maximum thickness of said diaphragm means being located adjacent said first location and the minimum thickness of said diaphragm means being in the region of the second location, the variations in thickness being such that the path travelled by said diaphragm-engaging means is substantially circular with the axis of said path being substantially coincident with said axis of rotation of said rotary actuator.

6. A rotary pump as in claim 3, wherein:
   said recess has a substantially uniform radius of curvature; and
   said diaphragm-engaging means includes a spherical roller arranged for rotation relative to said actuator.

7. The rotary pump of claim 6 wherein:
   said recess is formed about a second axis parallel to said central axis; and
   said diaphragm means varies in thickness about said axis from a maximum thickness in the region of said first location to a minimum thickness in the region of said second location, the depth of said recess and the varying thickness of said diaphragm means being such that the path of travel of said spherical roller is substantially circular with the axis of said path of travel being substantially coincident with said axis of rotation of said rotary actuator.

8. A rotary pump as in claim 3, wherein said diaphragm-engaging means includes a spherical roller in rolling engagement with said diaphragm and arranged for radial movement on said actuator relative to its axis of rotation and means carried by said actuator and engageable with said ball for yieldably urging it radially outwardly.

9. A rotary pump as defined in claim 3, wherein said diaphragm-engaging means includes a plurality of spherical rollers in rolling engagement with said diaphragm and disposed at substantially equi-angularly spaced intervals around said actuator, said spherical rollers being arranged for radial movement on said actuator relative to its axis of rotation.

10. A rotary diaphragm pump as in claim 3, wherein:
    said blocking means includes a generally longitudinally extending notch on said housing on the wall of said bore and a correspondingly shaped ridge formed integral with said diaphragm means engageable with said notch, said ridge having a cushioning chamber therein with bleed passage means between said chamber and said bore; and
    said diaphragm has a depression in the internal periphery thereof adjacent said ridge.

11. A modular, rotary diaphragm pump assembly, comprising:
    a plurality of pump modules in side-by-side relationship, each module including a housing having a bore therethrough with a diaphragm means mounted around said bore, said diaphragm means extending across said housing between said bore and the external edge of said housing, each of said modules having a rotary actuator means mounted within said bore, said actuator means having means for pumping engagement with said diaphragm means;
    drive shaft means extending through said plurality of pump modules in side-by-side relationship, with each of said actuator means being relatively moveable along said drive shaft means and rotationally keyed thereto; and
    assembly means for securing said plurality of pump modules in such side-by-side relationship, said assembly means including end plate means with bearing means for rotationally supporting said drive shaft means.

12. A modular, rotary diaphragm pump assembly, comprising:
    a plurality of pump modules in side-by-side relationship, each module including a substantially disc-shaped housing having a bore therethrough with a diaphragm means mounted around said bore, said diaphragm means extending across said housing between said bore and the external edge of said housing and including side flanges extending across the sides of said housing, each of said modules having a rotary actuator mounted within said bore, said actuator having means for pumping engagement with said diaphragm means;

drive shaft means rotationally keyed to each of said actuator means; and assembly means for securing said plurality of pump modules in such side-by-side relationship with said side flanges of said diaphragm means of adjacent pump modules abutting one another, said assembly means including end plate means with bearing means for rotationally supporting said drive shaft means.

13. A pump assembly as in claim 12, wherein the sides of each of said housings include insets adjacent said bore for receiving said side flanges of said diaphragm means, the depth of said insets into the sides of said housing being substantially equal to but less than the thickness of said side flanges and said assembly means includes means for forcefully urging adjacent sides of said housing into abutting relationship.

14. A pump assembly as in claim 12, wherein each of said actuator means is axially moveable relative to said drive shaft means.

References Cited
UNITED STATES PATENTS

| | | | |
|---|---|---|---|
| 40,195 | 10/1863 | Smith | 103—149 |
| 2,519,642 | 8/1950 | Ford | 103—149 |
| 2,585,949 | 2/1952 | MacCormack | 103—149 |
| 2,885,966 | 5/1959 | Ford | 103—149 |
| 2,946,291 | 7/1960 | Roebig | 103—149 |
| 3,408,946 | 11/1968 | McMillan | 103—149 |

DONLEY J. STOCKING, Primary Examiner

W. J. GOODLIN, Assistant Examiner

U.S. Cl. X.R.
418—45; 417—477